(12) United States Patent
Cowen

(10) Patent No.: US 11,080,698 B2
(45) Date of Patent: Aug. 3, 2021

(54) TOKENISATION OF PAYMENT DATA

(71) Applicant: Mastercard International Incorporated, Purchase, NY (US)

(72) Inventor: Michael John Cowen, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/416,534

(22) Filed: May 20, 2019

(65) Prior Publication Data
US 2019/0370795 A1 Dec. 5, 2019

(30) Foreign Application Priority Data
May 29, 2018 (EP) ..................................... 18174737

(51) Int. Cl.
*G06Q 40/00* (2012.01)
*G06Q 20/38* (2012.01)
(Continued)

(52) U.S. Cl.
CPC ......... *G06Q 20/385* (2013.01); *G06Q 20/351* (2013.01); *G06Q 20/409* (2013.01)

(58) Field of Classification Search
CPC .... G06Q 40/00; G06Q 20/385; G06Q 20/351; G06Q 20/409
See application file for complete search history.

(56) References Cited

U.S. PATENT DOCUMENTS

2015/0032625 A1 1/2015 Dill et al.
2015/0046338 A1* 2/2015 Laxminarayanan ........................
G06Q 20/38215
705/67
(Continued)

FOREIGN PATENT DOCUMENTS

WO 2017/210420 A1 12/2017

OTHER PUBLICATIONS

Consumer Preference: A Study of Mobile Digital Wallet Oyewole, Anas Olateju. Capitol Technology University, ProQuest Dissertations Publishing, 2018. 22624060. (Year: 2018).*
(Continued)

*Primary Examiner* — Lalita M Hamilton
(74) *Attorney, Agent, or Firm* — Buckley, Maschoff & Talwalkar LLC

(57) ABSTRACT

A method for a tokenisation service provider (TSP) to generate tokenised card numbers tPANs associated with real card numbers PANs for digital payment transactions, and a processor configured to perform the method are provided. The method comprises a TSP processor: receiving from a card issuer processor a request to generate one or more tokenised card numbers $tPAN^{1 \cdots m}$; generating and recording one or more tokenised card numbers $tPAN^{1 \cdots m}$, wherein the one or more $tPAN^{1 \cdots m}$ is/are not associated with a real card number PAN; receiving a real card number $PAN^i$ from the card issuer processor; and recording the mapping of the real card number $PAN^i$ to a tokenised card number $tPAN^{xE1 \cdots m}$ in a tokenisation service provider database. A method for a card issuer to provide tokenised card numbers tPANs associated with real card numbers PANs for digital payment transactions, and a processor configured to perform the method are also provided.

20 Claims, 2 Drawing Sheets

(51) Int. Cl.
*G06Q 20/34* (2012.01)
*G06Q 20/40* (2012.01)

(56) References Cited

U.S. PATENT DOCUMENTS

| | | |
|---|---|---|
| 2015/0319158 A1 | 11/2015 | Kumnick |
| 2016/0173483 A1* | 6/2016 | Wong ................ H04W 12/0608 726/9 |
| 2016/0217459 A1 | 7/2016 | Lindner et al. |
| 2017/0337542 A1* | 11/2017 | Kim ..................... G06Q 20/367 |
| 2018/0025347 A1 | 1/2018 | Tanzil et al. |
| 2019/0392424 A1* | 12/2019 | Wilson ................... G06Q 20/20 |

OTHER PUBLICATIONS

"PCT Notification of Transmittal of the International Search Report and the Written Opinion", International Searching Authority, dated Jul. 31, 2019 (Jul. 31, 2019), International Application No. PCT/US2019/024476, 12 pp.
"Communication: Extended European Search Report", dated 13 Aug. 13, 2018 (Aug. 13, 2018), for European Application No. 18174737.9-1217, 7pgs.

* cited by examiner

TOKENISATION OF PAYMENT DATA

CROSS-REFERENCE TO RELATED APPLICATION

This application is a U.S. National Stage filing under 35 U.S.C. § 119, based on and claiming benefits of and priority to Great Britain Application No. 18174737.9 filed on May 29, 2018. The entire disclosure of the above application is incorporated herein by reference for all purposes.

TECHNICAL FIELD

The present disclosure relates to a method for providing tokenised card numbers for digital payment transactions. In particular, the disclosure relates to a method for managing the provision of tokenised card numbers under the EMVCo payment tokenisation framework.

BACKGROUND

Payment transactions are increasingly being carried out electronically, whereby users can purchase goods and services online by entering their payment card details and authentication information at the merchant's online payment gateway. This data is then provided to the issuer of the payment card to authenticate the user and their purchase, and to ensure that the transaction data provided is valid and legitimate.

In some cases, the merchant may deploy a tokenised "card on file" solution, wherein the merchant will send card details to a tokenisation service provider and receive a tokenised account number which may for example only be valid for transactions at that particular merchant. The tokenised account number can be saved by the merchant and re-used for future transactions. This reduces the security risks associated with storing real payment data such as personal account numbers (PAN).

Payments transactions using smart devices and smartphones are also becoming more commonplace, and many smartphones are now equipped with NFC chips enabled to securely transmit payment details so a user may only 'touch' or 'tap' the phone or card to a point of sale terminal to process a payment transaction. Some mobile contactless payments services such as Android Pay rely on host-based card emulation (HCE), where payment credentials are stored in a secure location on the cloud rather than in a secure element on the mobile device. Others such as Apple Pay and Samsung Pay rely on a secure element on the mobile device. In both cases, the payment transaction is performed using a tokenised PAN rather than the real PAN, according to the EMVCo payment tokenisation specification (https://www.emvco.com/emv-technologies/payment-tokenisation/).

Digital payment services (also referred to as "digital wallets") such as MasterCard's MasterPass application may enable a user to make payments both online and using mobile devices equipped with an NFC chip.

Such payment services require the use of a tokenisation service provider, which is often provided by a card payment service (e.g. MasterCard Digital Enablement Service—MDES) or by a specialist provider of such tokenisation services. The tokenisation service provider maintains a mapping between the tokenised card number and the real card number and may also perform transaction validation checks (such as cryptographic and domain controls) before passing the transaction on to the card issuer.

In order to initiate tokenisation, the user or card issuer must provide the real card number (PAN) to the tokenisation service provider. In the case of digital wallets, this is typically done via the wallet provider. Because the real PAN is Sensitive Payment Data and Personally Identifiable Information, its provision by the card issuer to the tokenisation service provider may invoke handling requirements that may be onerous under some circumstances. For example, this may include the need to seek, obtain and manage explicit user consent before sharing Personally Identifiable Information (such as the user's real PAN) with a third party (e.g. a wallet provider or tokenisation service provider), which can introduce a delay in the process before a user is able to make use of a tokenised payment service. It would be desirable to have more efficient ways of enabling tokenisation of card data while still respecting the need to obtain user consent where required and/or appropriate such that the computational efficiency and load upon a tokenisation server is enhanced.

SUMMARY OF THE DISCLOSURE

According to an aspect of the present disclosure there is provided a method for a tokenisation service provider to generate tokenised card numbers tPANs associated with real card numbers PANs for digital payment transactions. The method comprises a tokenisation service provider processor receiving from a card issuer processor a request to generate one or more tokenised card numbers $tPAN^{1 \cdots m}$. The method further comprises the tokenisation service provider processor generating and recording one or more tokenised card numbers $tPAN^{1 \cdots m}$, wherein the one or more $tPAN^{1 \cdots m}$ is/are not associated with a real card number PAN. The method comprises the tokenisation service provider processor: receiving a real card number $PAN^i$ from the card issuer processor, and recording the mapping of the real card number $PAN^i$ to a tokenised card number $tPAN^{xE1 \cdots m}$ in a tokenisation service provider database.

In embodiments, the method further comprises the tokenisation service provider processor communicating with the card issuer processor to provide the one or more $tPAN^{1 \cdots m}$ that have been generated. In some such embodiments, the tokenisation service provider processor receiving a real card number $PAN^i$ from the card issuer processor comprises the tokenisation service provider processor receiving a tokenised $tPAN^{xE1 \cdots m}$ and a real card number $PAN^i$; and the tokenisation service provider processor recording the mapping of the real card number $PAN^i$ to a tokenised card number $tPAN^{xE1 \cdots m}$ in the tokenisation service provider database comprises the tokenisation service provider processor recording the mapping of the real card number $PAN^i$ to a tokenised card number $tPAN^x$ received from the card issuer processor.

In some embodiments, the tokenisation service provider processor receiving from the card issuer processor a request to generate one or more tokenised card numbers $tPAN^{1 \cdots m}$ comprises the tokenisation service provider processor receiving one or more identifiers $N^{1 \cdots m}$ from the card issuer processor, wherein the one or more identifiers $N^{1 \cdots m}$ do not have the same format as a real card number PAN; and the tokenisation service provider processor generating and recording one or more tokenised card numbers $tPAN^{1 \cdots m}$ comprises the tokenisation service provider processor generating and recording one or more tokenised card numbers $tPAN^{1 \cdots m}$ each associated with one of the one or more identifiers $N^{1 \cdots m}$.

In other embodiments, the tokenisation service provider processor receiving from the card issuer processor a request to generate one or more tokenised card numbers $tPAN^{1\cdots m}$ does not comprise the tokenisation service provider processor receiving one or more identifiers $N^{1\cdots m}$ from the card issuer processor. In such embodiments, the tokenisation service provider processor generating and recording one or more tokenised card numbers $tPAN^{1\cdots m}$ may comprise the tokenisation service provider processor generating and recording one or more tokenised card numbers $tPAN^{1\cdots m}$ each associated with one of a set of one or more identifiers $N^{1\cdots m}$ generated by the tokenisation service provider, or the tokenisation service provider processor generating and recording one or more tokenised card numbers $tPAN^{1\cdots m}$ without association to a set of identifiers.

In embodiments, the tokenisation service provider generating and recording one or more tokenised card numbers $tPAN^{1\cdots m}$, comprises the tokenisation service provider generating one or more tokenised card numbers associated with one or more virtual card numbers $vPAN^{1\cdots m}$ or identifiers $N^{1\cdots m}$ recorded in the tokenisation service provider database, wherein a virtual card number vPAN or identifier N is not associated with a user or account and cannot be used to perform financial transactions. In some such embodiments, each tokenised card number $tPAN^{1\cdots m}$ is mapped to a virtual card number $vPAN^{1\cdots m}$ or identifier $N^{1\cdots m}$ in the tokenisation service provider database.

In embodiments, the method further comprises the tokenisation service provider processor communicating with the card issuer processor to send the virtual card numbers $vPAN^{1\cdots m}$ or identifiers $N^{1\cdots m}$ that are recorded as mapped in the tokenisation service provider database, to the card issuer processor. In some embodiments, the tokenisation service provider processor receiving a real card number $PAN^i$ from the card issuer processor comprises the tokenisation service provider processor receiving a virtual card number $vPAN^{xE1\cdots m}$ or identifier $N^{xE1\cdots m}$ and a real card number $PAN^i$; and the tokenisation service provider processor recording the mapping of the real card number $PAN^i$ to a tokenised card number $tPAN^{xE1\cdots m}$ in a database comprises the tokenisation service provider processor recording the mapping of the real card number $PAN^i$ to the tokenised card number $tPAN^x$ that was previously associated with the virtual card number $vPAN^{xE1\cdots m}$ or identifiers $N^{xE1\cdots m}$ in the tokenisation service provider database.

In embodiments, the tokenisation service provider processor receiving from the card issuer processor a request to generate one or more tokenised card numbers $tPAN^{1\cdots m}$ comprises the tokenisation service provider processor receiving one or more virtual card numbers $vPAN^{1\cdots m}$ from the card issuer processor, wherein a virtual card number vPAN is not associated with a user or account and cannot be used to perform financial transactions; and the tokenisation service provider processor generating and recording one or more tokenised card numbers $tPAN^{1\cdots m}$ comprises the tokenisation service provider processor generating and recording one or more tokenised card numbers $tPAN^{1\cdots m}$ each associated with one of the one or more virtual card numbers $vPAN^{1\cdots m}$.

Optionally, the one or more virtual card numbers $vPAN^{1\cdots m}$ may have the same format as the real card numbers PAN to be associated with a tokenised card number tPAN, but the virtual card numbers $vPAN^{1\cdots m}$ are not associated with a user or account.

In embodiments, the tokenisation service provider processor receiving a real card number $PAN^i$ from the card issuer processor comprises the tokenisation service provider processor receiving a virtual card number $vPAN^{xE1\cdots m}$ or an identifier $N^{xE1\cdots m}$, and a real card number $PAN^i$; and the tokenisation service provider processor recording the mapping of the real card number $PAN^i$ to a tokenised card number $tPAN^{xE1\cdots m}$ in a database comprises the tokenisation service provider processor recording the mapping of the real card number $PAN^i$ to the tokenised card number $tPAN^x$ that was previously associated with the virtual card number $vPAN^{xE1\cdots m}$ or identifier $N^{xE1\cdots m}$. In some such embodiments, the method further comprises the tokenisation service provider processor generating and recording a new tokenised card number tPAN associated with the virtual card number $vPAN^{xE1\cdots m}$ or identifier $N^{xE1\cdots m}$.

According to a second aspect of the disclosure, there is provided a processor configured to perform the method of any of the embodiments of the first aspect of the disclosure.

In embodiments, the processor comprises an API allowing the card issuer processor to provide a real card number $PAN^i$ to be associated with a tokenised card number $tPAN^{xE1\cdots m}$.

According to a third aspect of the disclosure, there is provided a method for a card issuer to provide tokenised card numbers tPANs associated with real card numbers PANs for digital payment transactions. The method comprises a card issuer processor communicating with a tokenisation service provider processor to request the generation of one or more tokenised card numbers $tPAN^{1\cdots m}$, wherein the one or more $tPAN^{1\cdots m}$ is/are not associated with a real card number. The method further comprises a card issuer receiving consent from a user associated with a real card number PAN to share the real card number PAN; and the card issuer processor thereafter communicating with a tokenisation service provider processor to request that a real card number $PAN^i$ be mapped to a tokenised card number $PAN^{xE1\cdots m}$ and that the mapping be recorded in a tokenisation service provider database.

The card issuer processor communicating with a tokenisation service provider processor to request that a real card number $PAN^i$ be mapped to a tokenised card number $PAN^{xE1\cdots m}$ and that the mapping be recorded in a tokenisation service provider database may comprise the card issuer processor providing a real card number $PAN^i$ to the tokenisation service provider processor In embodiments, the method further comprises the card issuer processor receiving the one or more $tPAN^{1\cdots m}$ from the tokenisation service provider processor. In some such embodiments, the card issuer processor communicating with a tokenisation service provider processor to request that a real card number $PAN^i$ be mapped to a tokenised card number $PAN^{xE1\cdots m}$ and that the mapping be recorded in a tokenisation service provider database comprises the card issuer processor providing both the tokenised $tPAN^{xE1\cdots m}$ and the real card number $PAN^i$ to the tokenisation service provider processor.

In some embodiments, the card issuer processor communicating with the tokenisation service provider processor to request the generation of one or more tokenised card numbers $tPAN^{1\cdots m}$ comprises the card issuer processor sending one or more identifiers $N^{1\cdots m}$ to the tokenisation service provider processor, wherein the one or more identifiers $N^{1\cdots m}$ do not have the same format as a real card number PAN. Each of the one or more tokenised card numbers $tPAN^{1\cdots m}$ when generated by the tokenisation service provider may be associated with one of the one or more identifiers $N^{1\cdots m}$.

In embodiments, the one or more tokenised card numbers associated with one or more virtual card numbers vPAN$^{1\cdots m}$ or identifiers N$^{1\cdots m}$ are not associated with a user or account and cannot be used to perform financial transactions. In some such embodiments, the card issuer processor communicating with the tokenisation service provider processor to request the generation of one or more tokenised card numbers tPAN$^{1\cdots m}$ comprises the card issuer processor requesting that each tokenised card number tPAN$^{1\cdots m}$ that is generated by the tokenisation service provider processor is mapped to a virtual card number vPAN$^{1\cdots m}$ or identifier N$^{1\cdots m}$ in the tokenisation service provider database.

In embodiments, the method further comprises the card issuer receiving from the tokenisation service provider processor the virtual card numbers vPAN$^{1\cdots m}$ or identifiers N$^{1\cdots m}$ that are recorded as mapped in the tokenisation service provider database. In some embodiments, the card issuer processor communicating with the tokenisation service provider processor to request that a real card number PAN$^i$ be mapped to a tokenised card number PAN$^{xE1\cdots m}$ comprises the card issuer processor sending a virtual card number vPAN$^{xE1\cdots m}$ or identifier N$^{xE1\cdots m}$ and the real card number PAN$^i$ to the tokenisation service provider processor and requesting that the mapping of the real card number PAN$^i$ to a tokenised card number tPAN$^{xE1\cdots m}$ in the tokenisation service provider database comprises the mapping of the real card number PAN$^i$ to the tokenised card number tPAN$^x$ that was previously associated with the virtual card number vPAN$^{xE1\cdots m}$ or identifiers N$^{xE1\cdots m}$ in the tokenisation service provider database.

In embodiments, the card issuer processor communicating with the tokenisation service provider processor to request the generation of one or more tokenised card numbers tPAN$^{1\cdots m}$ comprises the card issuer processor sending one or more virtual card numbers vPAN$^{1\cdots m}$ to the tokenisation service provider processor, wherein a virtual card number vPAN is not associated with a user or account and cannot be used to perform financial transactions; and the one or more tokenised card numbers tPAN$^{1\cdots m}$ when generated by the tokenisation service provider processor are each associated with one of the one or more virtual card numbers vPAN$^{1\cdots m}$ in the tokenisation service provider database.

Optionally, the one or more virtual card numbers vPAN$^{1\cdots m}$ may have the same format as the real card numbers PAN to be associated with a tokenised card number tPAN, but the virtual card numbers vPAN$^{1\cdots m}$ are not associated with a user or account.

In embodiments, the card issuer processor sending a real card number PAN$^i$ to the tokenisation service processor comprises the card issuer processor sending a virtual card number vPAN$^{xE1\cdots m}$ or an identifier N$^{xE1\cdots m}$, and a real card number PAN$^i$; and requesting that the mapping of the real card number PAN$^i$ to a tokenised card number tPAN$^{xE1\cdots m}$ that was previously associated with the virtual card number vPAN$^{xE1\cdots m}$ or an identifier N$^{xE1\cdots m}$ be recorded in the database. In some such embodiments, the tokenisation service provider processor may then generate and record a new tokenised card number tPAN associated with the virtual card number vPAN$^{xE1\cdots m}$ or identifier N$^{xE1\cdots m}$. In such embodiments, the method may further comprise the card issuer processor receiving from the tokenisation service provider processor the new tokenised card number tPAN and/or an indication that the virtual card number vPAN$^{xE1\cdots m}$ or identifier N$^{xE1\cdots m}$ is now associated with a new tPAN$^{1\cdots m}$ which is not associated with a real card number.

According to a fourth aspect of the disclosure, there is provided a processor configured to perform the method of any of the embodiments of the third aspect of the disclosure.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

Figure 1:
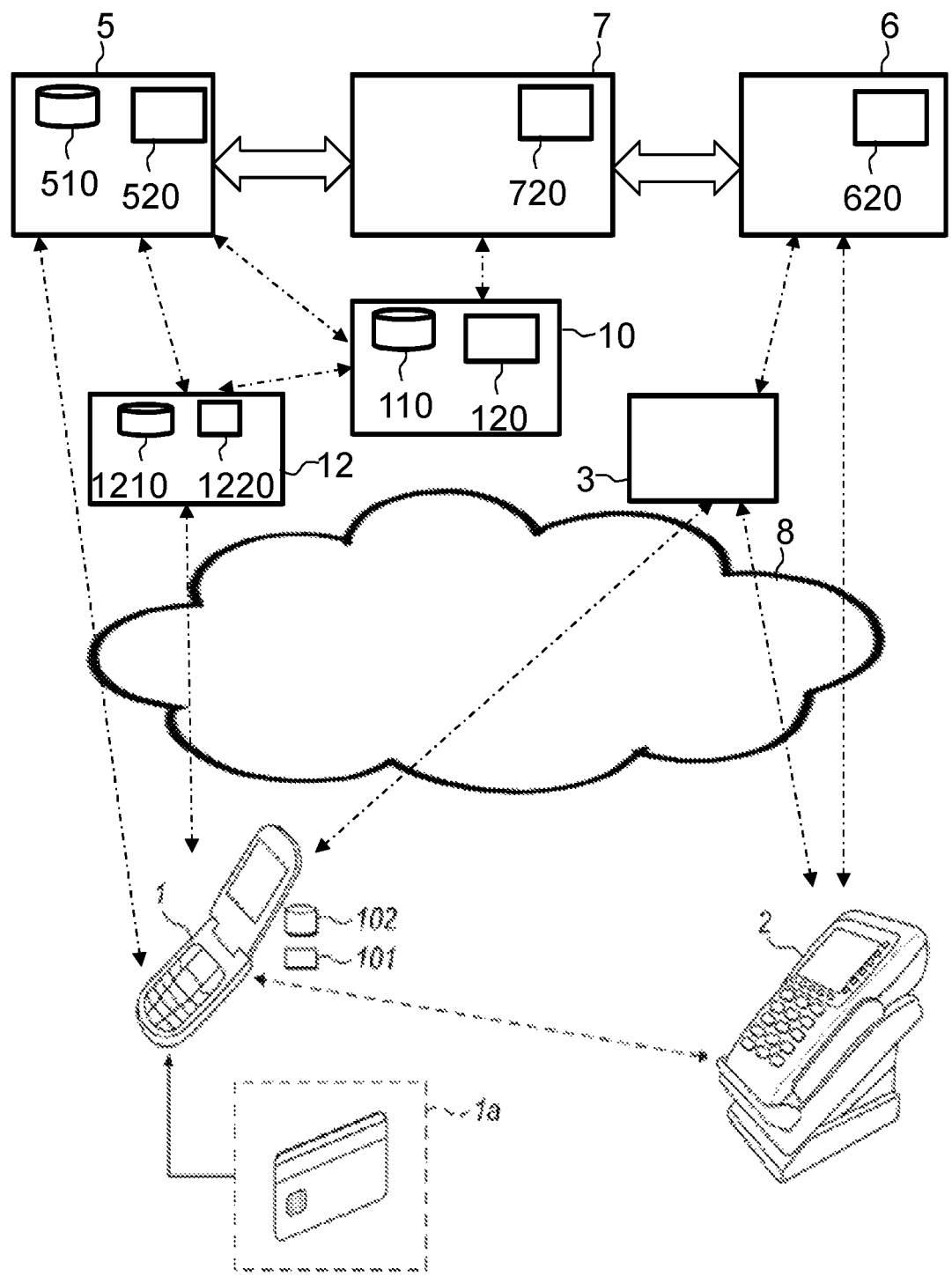
FIG. 1 shows an exemplary transaction system in which embodiments of the present disclosure may be used.

Where the figures laid out herein illustrate embodiments of the present disclosure, these should not be construed as limiting to the scope of the disclosure. Where appropriate, like reference numerals will be used in different figures to relate to the same structural features of the illustrated embodiments.

DETAILED DESCRIPTION

Specific embodiments are described below with reference to the figures.

FIG. 1 shows an exemplary transaction system in which embodiments of the disclosure may be used.

A user (not shown—also referred to as "cardholder") is provided with a payment device—this may be for example a mobile computing device, such as a mobile phone 1, acting as a proxy for a payment card 1a. The payment card 1a is provided to the user by a card issuer 5, and is associated with payment credentials such as a card/account number (PAN). The mobile device has at least one processor 101 and at least one memory 102 together providing at least one execution environment. These devices have firmware and applications run in at least one regular execution environment (REE) with an operating system such as iOS, Android or Windows. Payment devices will typically be equipped with means to communicate with other elements of a payment infrastructure. These communication means may comprise antennae and associated hardware and software to enable communication by NFC and associated contactless card protocols such as those defined under ISO/IEC 14443, or they may comprise an antenna and associated hardware and software to allow local wireless networking using 802.11 protocols or any combination of the above.

Other computer equipment in a conventional infrastructure is typically fixed, but in cases of interest point of interaction (POI) terminals 2 may also be mobile. The example shown is a mobile point-of-sale (MPOS) terminal 2 used by a merchant interacting with the user. This type of POI terminal may support NFC-enabled transactions and/or transactions that involve the use of magnetic stripe technology. Such equipment is typically connected or connectable to an acquiring bank 6 or other system in a secure way (either through a dedicated channel or through a secure communication mechanism over a public or insecure channel—here connection is shown as passing through the public internet 8). Alternatively, the payments may be mediated by a payment gateway 3 acting for a merchant—this may be an internet payment gateway acting for an online merchant, for example, thereby enabling remote payments to be carried out.

There is also shown a mechanism to allow connection between the mobile device 1 and the card issuing bank 5 or system. A banking infrastructure 7 will also connect the card issuer 5 and the acquiring bank 6, allowing transactions to be carried out between them. This banking infrastructure 7 will typically be provided by a card transaction services provider, for example MasterCard, who provides card transaction services to the card issuing bank 5. The banking infrastructure 7 provides authorisation at the time of purchase, clearing of the transaction and reconciliation typically within the same working day, and settlement of payments shortly after that. The banking infrastructure 7, acquiring bank 6 and issuing bank 5 comprise a plurality of switches, servers and databases, and are not described further here as the details of the banking infrastructure, acquiring bank 6 and issuing bank 5 used are not necessary for understanding how embodiments of the disclosure function and may be implemented. The issuing bank 5 comprises at least a card database 510, and a processor 520. The banking infrastructure 7 comprises at least a processor 720. The acquiring bank 6 comprises at least a processor 620.

A tokenisation service provider 10 is shown, which is connected to the card issuer 5, and the banking infrastructure 7. The tokenisation service provider 10 may also be connected to the acquiring bank 6, directly or via the banking infrastructure 7. In embodiments, the tokenisation service provider 10 may be provided as part of the banking infrastructure 7 or the card issuer 5, or may be a separate service. The tokenisation service provider 10 typically comprises a plurality of switches, servers and databases, including at least a mapping database 110 storing tokenised card numbers and their corresponding "real" card numbers, as further explained below, and a processor 120. The tokenisation service provider 10 will not be described further here as the details are not necessary for understanding how embodiments of the disclosure function and may be implemented.

On request by the card issuer 5 or the cardholder, the tokenisation service provider 10 will generate a tokenised card number (referred to herein as "tPAN" for "tokenised primary account number") associated with a card number provided by the card issuer 5, and associate credentials with this tokenised PAN. The tokenised PAN typically has the same attributes (i.e. the same characteristics such as brand, product type, etc.) associated with it as the real card for which tokenisation is required.

For example, in the case of a digital wallet (i.e. a digital payment service provided by a wallet provider 12), the cardholder or the card issuer 5 will typically initiate a request to tokenise a specified card number with the wallet provider 12. The wallet provider 12 comprises at least a processor 1220 and a tokenised PAN database 1210. The wallet provider may be a third party (e.g. Apple Pay) or in some cases the issuer 5 themselves.

The wallet provider 12 will then send a tokenisation request that includes the card number to the tokenisation service provider 10. The tokenisation service provider 10 will request an authorisation from the card issuer 5 to tokenise the card number. Depending on the response from the issuer 5, the tokenisation service provider 10 may either reject the request to generate a tPAN or proceed with the request (with or without performing identification and verification of the user, as the case may be). Once the tokenisation service provider 10 has obtained authorisation (and identification and verification have been completed, if necessary), the tokenisation service provider 10 generates a tPAN and credentials and provides these to the wallet provider 12. The tPAN may be recorded in the tPAN database 1210 of the wallet provider. Once the wallet provider 12 has obtained the tPAN, the real PAN will be discarded and only the tokenisation service provider 10 and card issuer 5 retain the record of the real PAN.

The tokenisation service provider 10 maintains the mapping between the PAN provided by the card issuer 5 and the tPAN. The tPAN has the same format as a real PAN (referred to as "PAN" throughout this document) and is associated with credentials that allow it to be used to perform transactions within an EMV tokenisation framework. For example, the tPAN may be provided to the mobile device 1 (for example by the wallet provider 12), thereby enabling the mobile device 1 to use the tPAN to make payments, without storing Sensitive Payment Data such as the real PAN (PAN) on the device. A tPAN may be provided to the merchant for card on file transactions. Only the tokenisation service provider 10 and the card issuer 5 have access to the real card details. The tokenised PAN can be used by the banking infrastructure 7 during the processing of a transaction (for example a tPAN provided by a mobile device 1 to a POS terminal 2 or a tPAN saved by a merchant for a card on file transaction), and the tPAN will be reconciled with the real PAN by the tokenisation service provider 10. The tokenisation service provider 10 may also perform transaction validation checks (such as cryptographic and domain controls) before passing the transaction on to the card issuer 5. The tokenisation service provider 10 then communicates the PAN to the card issuer 5 that can then process the transaction in a similar way as a conventional transaction initiated with a real PAN.

The present applicant has devised an improved method of managing the tokenisation process.

One of the challenges associated with the need for tokenised payment information for digital payments is that the card issuer (or cardholder) must provide the real card number to the tokenisation service provider (for example via the Wallet Provider) in order to generate the PAN to tPAN mapping. The real card number is Sensitive Payment Data and Personally Identifiable Information, and communicating this information to the tokenisation service provider 10 may invoke data handling requirements which may be onerous. This also limits the ability of card issuers to provide to their customers a "digital from the start" service whereby every account is inherently compatible with a digital payment service. Indeed, the provision of such services would require the card issuer to (i) obtain consent (from the cardholder) in order to request a tokenised card number (since this requires communication of the real card number, which is Sensitive Payment Data and Personally Identifiable Information, to a third party, the tokenisation service provider); and (ii) obtain a tokenised card number and maintain two card numbers (a real and a tokenised one) for each single card; regardless of whether or not a user will ultimately make use of the service.

The present applicant has, however, appreciated that tokenised card numbers can be generated without the need to be associated with a real card number, provided that the tokenised card number can be associated with a real card number at a later time, for example when a user wishes to make use of a digital payment service.

Figure 2:
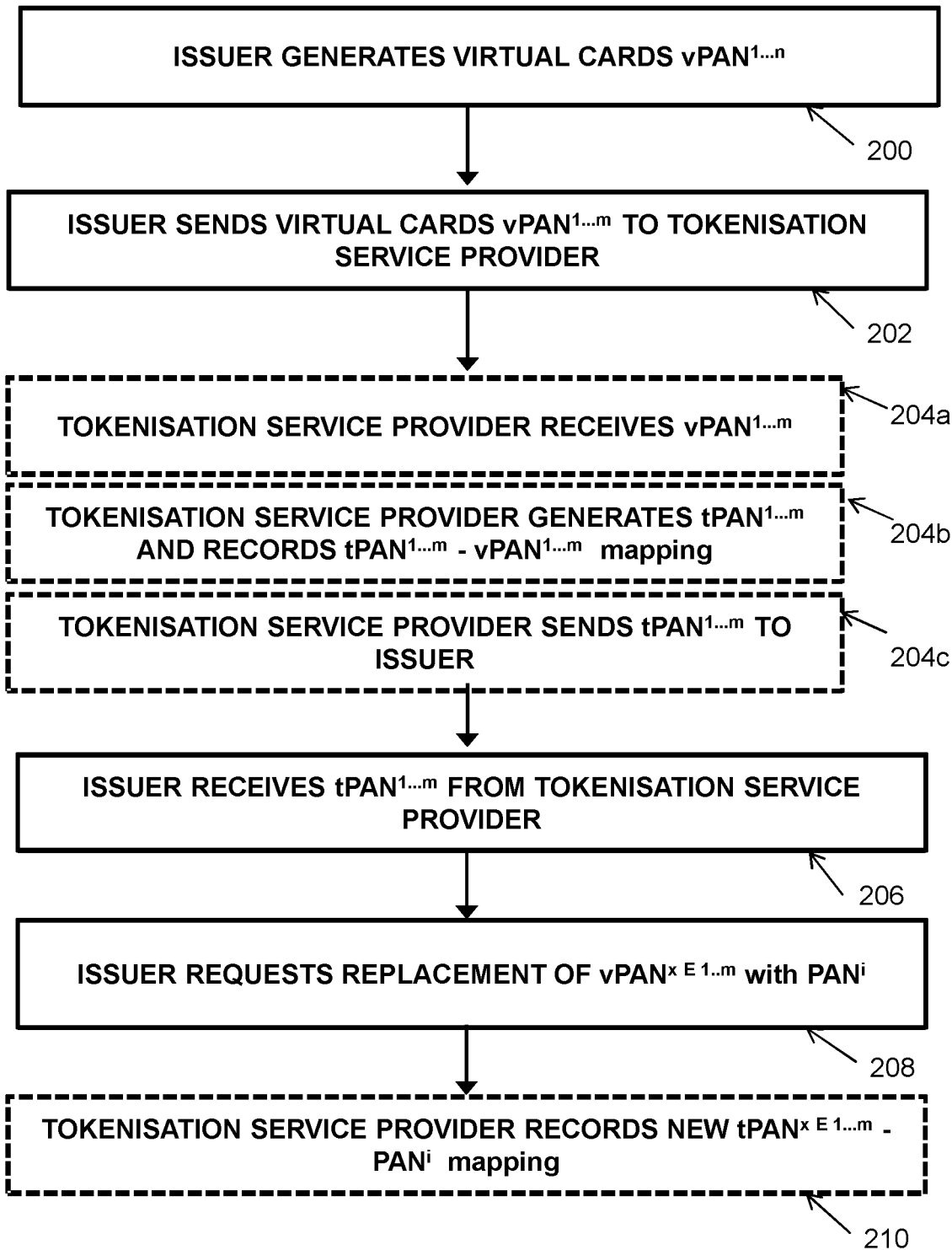
FIG. 2 is a flow chart illustrating the process of generating a tokenised card number, according to an embodiment of the present disclosure.

FIG. 2 is a flow chart illustrating the process of generating a tokenised card number, according to an embodiment of the present disclosure.

At step 200, the card issuer 5 generates one or more virtual card numbers $vPAN^{1\cdots n}$. In some embodiments, the virtual card numbers have the same attributes (such as brand, product type, etc.) associated with them as the real cards for which tokenisation will be required. In some embodiments, the virtual card numbers have the same format as the real cards for which tokenisation will be required, while in other embodiments the vPANs may take a different format as a real PAN for which tokenisation will be required.

However, the virtual card numbers are not associated with individual cardholders or accounts, nor with physical cards issued to a user. Therefore, vPANs are not Personally Identifiable Information, nor are they Sensitive Payment Data, since they are not associated with a user or their real payment details and cannot be used to make a payment. The virtual card number or $vPAN^{1\cdots n}$ may be recorded in the card issuer's card database 510. At step 202, the card issuer 5 sends one or more of the virtual card numbers/ $vPANs^{1\cdots m\ (msn)}$ to the tokenisation service provider 10. Because virtual card numbers are not associated with any cardholder, they are not Personally Identifiable Information and the card issuer 5 can send virtual card numbers to the tokenisation service provider 10 without the additional overhead associated with communicating real card details, such as for example the need to obtain in advance consent from a user.

The virtual card numbers $vPAN^{1\cdots n}$ may be treated by the tokenisation service provider 10 in the same way as real cards would be treated, since they have the same format as real cards. The tokenisation service provider 10 can therefore receive 204a the vPANs, generate 204b a tokenised card number (tPAN) for each virtual card number (vPAN) sent by the card issuer 5 (and associate EMV/cryptographic credentials with these tokenised PANs, in order for them to be usable in lieu of real card numbers for some financial transactions), record 204b the vPAN to tPAN mapping and send 204c the tPANs to the card issuer 5. At step 206, the card issuer 5 receives a $tPAN^{1\cdots m}$ associated with each of the $vPAN^{1\cdots m}$ that were sent to the tokenisation service provider 10 at step 202. In embodiments, the issuer may not automatically receive the $tPAN^{1\cdots m}$ associated with the $vPAN^{1\cdots m}$. In such embodiments, the tPAN associated with a vPAN may be obtained by the card issuer 5 on request to the tokenisation service provider 10. In embodiments, the card issuer 5 may maintain a mapping of tPAN to vPAN, in the card database 510. In other embodiments, the card issuer 5 may maintain a list of vPANs that are currently associated with tPANs, and/or a list of vPANs that are currently free (i.e. not associated with a tPAN), in the card database 510.

At a later step, for example when the card issuer 5 wishes to enable a digital payment service for a cardholder, for example at the cardholder's request and/or following a cardholder having provided consent to share the cardholder's Personally Identifiable Information, the card issuer 5 can provide the real card number $PAN^i$ of a specific cardholder to the tokenisation service provider 10, and request 208 that this replaces a given $vPAN^{x\ E\ 1\cdots m}$ that is associated with a given $tPAN^{x\ E\ 1\cdots m}$ in the mapping database 110 of the tokenisation service provider 10. In embodiments, the card issuer 5 may maintain a temporary mapping between a $PAN^i$ and $vPAN^x$ and/or $tPAN^x$, in the card database 510. In embodiments, requesting the replacement of a $vPAN^x$ with a $PAN^i$ may comprise providing the $vPAN^x$, $tPAN^x$ or both, as well as the $PAN^i$, to the tokenisation service provider 10. Advantageously, using the method according to embodiments of the disclosure, a vPAN to tPAN mapping may need only be maintained temporarily, when generating a tPAN and until such a time that a user wishes to use a payment service requiring a tPAN, such that the card issuer 5 can then map the user's real PAN to a tPAN, and discard or reuse the vPAN that was previously associated with the tPAN.

Requesting the replacement of $vPAN^x$ with $PAN^i$ can be done for example using an API provided by the tokenisation service provider 10 to this effect. API services that can be used to update card numbers associated with a given tPAN are provided by some tokenisation service providers such as MasterCard Digital Enablement Service (MDES). These services may already be used by a card issuer 5 to update card details when a new card is issued to a user, for example when their original card was lost or stolen. Advantageously, this method would therefore require very limited disruption of the functioning of a tokenisation service provider, as well as limited disruption of the issuer's integration to the tokenisation service provider and their business processes (since the issuer may be able to use services that they are already using to interact with the tokenisation service provider), in order to obtain the benefits of the disclosure.

At step 210, the tokenisation service provider 10 records the new $tPAN^{x\ E\ 1\cdots m}$-$PAN^i$ mapping in the mapping database 110. As a consequence, $vPAN^{x\ E\ 1\cdots m}$ is no longer associated with a $tPAN^{x\ E\ 1\cdots m}$. The card issuer 5 may be able to re-use $vPAN^x$ as a virtual card number in step 202, in order to generate a new tPAN that will be available for association with a new real PAN as and when needed.

In embodiments, the card issuer 5 may maintain a mapping of tPAN to PAN in the card database 510. In embodiments, the card issuer 5 may not maintain a mapping between real PANs and tPANs, and may instead, when a transaction is initiated at a POS, receive transaction information containing the real PAN (e.g. an authorisation request), which the tokenisation service provider 10 has mapped from a tPAN provided by the POS initiating the transaction. Similarly, when the card issuer 5 sends a message (for example an authorisation response) for a transaction involving a tokenised PAN the card issuer 5 may use the real PAN, which can then be mapped back to the tPAN by the tokenisation service provider 10, before sending the message (e.g. authorisation response) back to the POS, such that the POS only deals with the tPAN and never has knowledge of the PAN.

As mentioned above, in embodiments the functionalities of the tokenisation service provider 10 may be provided by an independent service (as illustrated schematically in FIG. 1). In embodiments, these functionalities may instead be provided as an integral part of the banking infrastructure 7.

In embodiments, instead of using vPANs having the same format as the real cards for which tokenisation will be required, identifiers $N^{1\cdots m}$ (e.g. a number) may be used which do not necessarily have the same format as a real card. In such embodiments, identifiers $N^{1\cdots m}$ may be provided to the tokenisation service provider 10 at step 202 instead of $vPAN^{1\cdots m}$. Similarly to a vPAN, an identifier N is not Sensitive Payment Data or Personally Identifiable Information, since it is not associated with a cardholder or a cardholder account. Subsequent steps 204a to 210 may proceed as explained above, except that references to a vPAN are to be understood as referring to an identifier N. In such embodiments, the tokenisation service provider 10 must have the ability to generate tPANs from identifiers N that do not have the same format as real PANs, or the ability to generate a vPAN that has the same format as real PAN, from an identifier N. As a consequence, the step of the card issuer 5 sending one or more identifiers $N^1 \cdots {}^m$ to the tokenisation service provider 10 may include the card issuer 5 specifying the format of the $tPAN^1 \cdots {}^m$ that are to be generated.

In embodiments, the card issuer 5 may not provide identifiers N or vPANs to the tokenisation service provider 10 at step 202. Instead, the card issuer 5 may simply request that a number m of $tPAN^1 \cdots {}^m$ of a chosen format is generated. The tokenisation service provider 10 may generate $tPAN^1 \cdots {}^m$ using vPANs that are known only to the tokenisation service provider 10, for example if the tokenisation method used relies on the use of a vPAN having the same format as the real PANs for which tokenisation will be required. Alternatively, the tokenisation service provider 10 may generate $tPAN^1 \cdots {}^m$ using identifiers N that are known only to the tokenisation service provider 10, for example if the tokenisation method used does not rely on the use of a vPAN having the same format as the real PANs for which tokenisation will be required. In some embodiments, a mapping of identifiers N or virtual card numbers vPAN and derived tPANs may be stored at the tokenisation service provider 10. In other embodiments, once a tPAN has been created based on an identifier N or vPAN, the identifier N/vPAN may be discarded or reused to generate a new tPAN. In such embodiments, the tokenisation service provider 10 may record and maintain a list of tPANs that are currently not associated with real PANs, as well as a list of tPANs that are currently associated with real PANs.

In embodiments where the card issuer 5 does not provide real PANs/identifiers N based on which tPANs are generated, the tokenisation service provider 10 may send the tPANs that have been generated, to the card issuer 5. As a result, the card issuer 5 may maintain a list of tPANs that are currently not associated with a vPAN. In these embodiments, the card issuer 5 may simply associate a real PAN with any available tPAN, and request that the tokenisation service provider 10 records this new mapping, when a user provides consent for the real PAN to be shared with the tokenisation service provider 10.

The methods of the disclosure allow the card issuer 5 to efficiently generate a tPAN for a cardholder who may in the future make use of a digital payment service, without having to maintain both a tPAN and a PAN for each customer for the lifetime of the PAN. In particular, according to the disclosure, a card issuer 5 is able to cause a tPAN to be generated by a tokenisation service provider 10 without sharing any Personally Identifiable Information or Sensitive Payment Data. A tPAN can subsequently be associated with a PAN, when the user of the PAN has provided consent. In some embodiments, the card issuer 5 may be able to maintain a very limited mapping (e.g. a mapping of vPANs currently associated with tPANs) or even just a list of vPANs/tPANs that are currently associated with a tPAN/vPAN in the mapping database 110 of the tokenisation service provider 10, and does not need to maintain a full mapping of vPAN to tPAN on an ongoing basis.

In embodiments where an identifier N or a vPAN is provided by the card issuer 5 to the tokenisation service provider 10 to generate a tPAN, the card issuer 5 may not need to maintain a mapping of vPAN to available tPAN. Instead, the card issuer 5 may simply maintain a list of vPANs/identifiers N that are currently associated with available tPANs in the tokenisation service provider database 110, until the card issuer 5 requests that a given $vPAN^x$/identifier $N^x$ is replaced by a real $PAN^i$ in the tokenisation service provider's database 110. The card issuer 5 may additionally remove the $vPAN^x$/identifier $N^x$ from the list of available vPANs/identifiers N. The tokenisation service provider 10 may provide the $tPAN^x$ that was associated with the $vPAN^x$/identifier $N^x$ to the card issuer 5, who may then record the real $PAN^i$ to $tPAN^x$ mapping in the card issuer database 520. The tokenisation service provider 10 may then re-use the $vPAN^x$/identifier $N^x$ to generate a new tPAN, upon which the card issuer 5 may record the $vPAN^x$/identifier $N^x$ in the list of available vPANs/identifiers N.

Similarly, in embodiments where the card issuer 5 records and maintains a list of available tPANs, the card issuer 5 may not maintain any mapping for these tPANs. Instead, the card issuer 5 may simply maintain a list of tPANs that are currently available (i.e. not mapped to a real PAN in the tokenisation service provider database 110), until the card issuer 5 requests that a given $tPAN^x$ is associated with a real $PAN^i$ in the tokenisation service provide database 110. The card issuer 5 may additionally remove the $tPAN^x$ from the list of available tPANs and record the new association in the card issuer database 510. If the tokenisation service provider 10 maintained a mapping of $vPAN^x$/identifier $N^x$ to $tPAN^x$ (which mapping may have been unknown to the card issuer 5), the tokenisation service provider 10 may then re-use the $vPAN^x$/identifier $N^x$ to generate a new tPAN, and provide the new tPAN to the card issuer 5 for recordal in the list of available tPANs on the card issuer database 510.

The invention claimed is:

1. A tokenisation service provider processor configured to implement a method to generate tokenised card numbers tPANs associated with real card numbers PANs for digital payment transactions, the method comprising:
   the tokenisation service provider processor receiving from a card issuer processor a request to generate one or more tokenised card numbers $tPAN^1 \cdots {}^m$;
   the tokenisation service provider processor generating and recording one or more tokenised card numbers $tPAN^1 \cdots {}^m$, wherein the one or more $tPAN^1 \cdots {}^m$ are generated and recorded without an associated real card number PAN;
   the tokenisation service provider processor receiving a request to tokenise a real card number $PAN^i$ from the card issuer processor, the request including the real card number $PAN^i$;
   the tokenisation service provider processor recording a mapping of the real card number $PAN^i$ to a tokenised card number $tPAN^{xE1} \cdots {}^m$ in a tokenisation service provider database; and
   the tokenisation service provider processor issuing a response to the request to tokenise, the response including the tokenised card number $tPAN^{xE1} \cdots {}^m$.

2. The tokenisation service provider processor of claim 1, wherein the issuing a response to the request to tokenise further comprises the tokenisation service provider processor communicating with the card issuer processor to provide the one or more $tPAN^1 \cdots {}^m$ that have been generated.

3. The tokenisation service provider processor of claim 2, wherein:
   the tokenisation service provider processor receiving a real card number $PAN^i$ from the card issuer processor comprises the tokenisation service provider processor receiving a tokenised $tPAN^{xE1} \cdots {}^m$ and a real card number $PAN^i$; and
   the tokenisation service provider processor recording the mapping of the real card number $PAN^i$ to a tokenised card number $tPAN^{xE1} \cdots {}^m$ in the tokenisation service provider database comprises the tokenisation service provider processor recording the mapping of the real card number $PAN^i$ to a tokenised card number $tPAN^x$ received from the card issuer processor.

4. The tokenisation service provider processor of claim 1, wherein the tokenisation service provider generating and recording one or more tokenised card numbers $tPAN^{1 \cdots m}$, comprises the tokenisation service provider generating one or more tokenised card numbers associated with one or more virtual card numbers $vPAN^{1 \cdots m}$ or identifiers $N^{1 \cdots m}$ recorded in the tokenisation service provider database, wherein a virtual card number vPAN or identifier N is not associated with a user or account and cannot be used to perform financial transactions.

5. The tokenisation service provider processor of claim 4, wherein the tokenisation service provider processor is configured to map each tokenised card number $tPAN^{1 \cdots m}$ to a virtual card number $vPAN^{1 \cdots m}$ or identifier $N^{1 \cdots m}$ in the tokenisation service provider database.

6. The tokenisation service provider processor of claim 5, wherein the method further comprises the tokenisation service provider processor communicating with the card issuer processor to send the virtual card numbers $vPAN^{1 \cdots m}$ or identifiers $N^{1 \cdots m}$ that are recorded as mapped in the tokenisation service provider database, to the card issuer processor.

7. The tokenisation service provider processor of claim 6, wherein the tokenisation service provider processor receiving a real card number $PAN^i$ from the card issuer processor comprises the tokenisation service provider processor receiving a virtual card number $vPAN^{xE1 \cdots m}$ or identifier $N^{xE1 \cdots m}$ and a real card number $PAN^i$; and
the tokenisation service provider processor recording the mapping of the real card number $PAN^i$ to a tokenised card number $tPAN^{xE1 \cdots m}$ in a database comprises the tokenisation service provider processor recording the mapping of the real card number PAN' to the tokenised card number $tPAN^x$ that was previously associated with the virtual card number $vPAN^{xE1 \cdots m}$ or identifiers $N^{xE1 \cdots m}$ in the tokenisation service provider database.

8. The tokenisation service provider processor of claim 1, wherein:
the tokenisation service provider processor receiving from the card issuer processor a request to generate one or more tokenised card numbers $tPAN^{1 \cdots m}$ comprises the tokenisation service provider processor receiving one or more virtual card numbers $vPAN^{1 \cdots m}$ from the card issuer processor, wherein a virtual card number vPAN is not associated with a user or account and cannot be used to perform financial transactions; and
the tokenisation service provider processor generating and recording one or more tokenised card numbers $tPAN^{1 \cdots m}$ comprises the tokenisation service provider processor generating and recording one or more tokenised card numbers $tPAN^{1 \cdots m}$ each associated with one of the one or more virtual card numbers $vPAN^{1 \cdots m}$.

9. The tokenisation service provider processor of claim 8, wherein the one or more virtual card numbers $vPAN^{1 \cdots m}$ have the same format as the real card numbers PAN to be associated with a tokenised card number tPAN, but the virtual card numbers $vPAN^{1 \cdots m}$ are not associated with a user or account.

10. The tokenisation service provider processor of claim 8, wherein:
the tokenisation service provider processor receiving a real card number $PAN^i$ from the card issuer processor comprises the tokenisation service provider processor receiving a virtual card number $vPAN^{xE1 \cdots m}$ or an identifier $N^{xE1 \cdots m}$, and a real card number $PAN^i$; and
the tokenisation service provider processor recording the mapping of the real card number $PAN^i$ to a tokenised card number $tPAN^{xE1 \cdots m}$ in a database comprises the tokenisation service provider processor recording the mapping of the real card number $PAN^i$ to the tokenised card number $tPAN^x$ that was previously associated with the virtual card number $vPAN^{xE1 \cdots m}$ or an identifier $N^{xE1 \cdots m}$.

11. The tokenisation service provider processor of claim 10, wherein the method further comprises the tokenisation service provider processor generating and recording a new tokenised card number tPAN associated with the virtual card number $vPAN^{xE1 \cdots m}$ or identifier $N^{xE1 \cdots m}$.

12. The tokenisation service provider processor of claim 1, wherein:
the tokenisation service provider processor receiving from the card issuer processor a request to generate one or more tokenised card numbers $tPAN^{1 \cdots m}$ comprises the tokenisation service provider processor receiving one or more identifiers $N^{1 \cdots m}$ from the card issuer processor, wherein the one or more identifiers $N^{1 \cdots m}$ do not have the same attributes as a real card number PAN; and
the tokenisation service provider processor generating and recording one or more tokenised card numbers $tPAN^{1 \cdots m}$ comprises the tokenisation service provider processor generating and recording one or more tokenised card numbers $tPAN^{1 \cdots m}$ each associated with one of the one or more identifiers $N^{1 \cdots m}$.

13. The processor of claim 1, wherein the processor comprises an API allowing the card issuer processor to provide a real card number $PAN^i$ to be associated with a tokenised card number $tPAN^{xE1 \cdots m}$.

14. A method for a tokenisation service provider to generate tokenised card numbers tPANs associated with real card numbers PANs for digital payment transactions, the method comprising:
a tokenisation service provider processor receiving from a card issuer processor a request to generate one or more tokenised card numbers $tPAN^{1 \cdots m}$;
the tokenisation service provider processor generating and recording one or more tokenised card numbers $tPAN^{1 \cdots m}$, wherein the one or more $tPAN^{1 \cdots m}$ are generated generated and recorded without an associated real card number PAN;
the tokenisation service provider processor receiving a request to tokenise a real card number $PAN^i$ from the card issuer processor, the request including the real card number $PAN^i$;
the tokenisation service provider processor recording a mapping of the real card number $PAN^i$ to a tokenised card number $tPAN^{xE1 \cdots m}$ in a tokenisation service provider database; and
the tokenisation service provider processor issuing a response to the request to tokenise, the response including the tokenised card number $tPAN^{xE1 \cdots m}$.

15. A processor configured to perform a method for a card issuer to provide tokenised card numbers tPANs associated with real card numbers PANs for digital payment transactions, the method comprising:
the processor communicating with a tokenisation service provider processor to request the generation of one or more tokenised card numbers $tPAN^{1 \cdots m}$, wherein the one or more $tPAN^{1\cdots m}$ are generated and recorded without an associated real card number;

the processor receiving a consent from a user associated with the real card number PAN to share the real card number PAN; and the processor communicating with a tokenisation service provider processor to request that the real card number $PAN^i$ be mapped to a tokenised card number $PAN^{xE1\cdots m}$ and that the mapping be recorded in a tokenisation service provider database.

16. The processor of claim 15, wherein the processor communicating with the tokenisation service provider processor to request the generation of one or more tokenised card numbers $tPAN^{1\cdots m}$ comprises the processor sending to the tokenisation service provider processor:

one or more identifiers $N^{1\cdots m}$, wherein the one or more identifiers $N^{1\cdots m}$ do not have the same format as a real card number PAN, are not associated with a user or account and cannot be used to perform financial transactions; or one or more virtual card numbers $vPAN^{1\cdots m}$, wherein each virtual card number vPAN has the same format as the real card numbers PAN to be associated with a tokenised card number tPAN but is not associated with a user or account and cannot be used to perform financial transactions.

17. The processor of claim 16, wherein the processor communicating with the tokenisation service provider processor to request the generation of one or more tokenised card numbers $tPAN^{1\cdots m}$ comprises the card issuer processor requesting that each tokenised card number $tPAN^{1\cdots m}$ that is generated by the tokenisation service provider processor is mapped to a virtual card number $vPAN^{1\cdots m}$ or identifier $N^{1\cdots m}$ in the tokenisation service provider database.

18. The processor of claim 16, wherein:

the processor is further configured to receive from the tokenisation service provider processor the virtual card numbers $vPAN^{1\cdots m}$ or identifiers $N^{1\cdots m}$ that are recorded as mapped in the tokenisation service provider database.

19. The processor of claim 18, wherein the processor communicating with the tokenisation service provider processor to request that a real card number $PAN^i$ be mapped to a tokenised card number $PAN^{xE1\cdots m}$ comprises the processor sending a virtual card number $vPAN^{xE1\cdots m}$ or identifier $N^{xE1\cdots m}$ and the real card number $PAN^i$ to the tokenisation service provider processor; and the processor requesting that the mapping of the real card number $PAN^i$ to a tokenised card number $tPAN^{xE1\cdots m}$ be recorded in the tokenisation service provider database comprises the processor requesting that the mapping of the real card number $PAN^i$ to the tokenised card number $tPAN^x$ that was previously associated with the virtual card number $vPAN^{xE1\cdots m}$ or identifiers $N^{xE1\cdots m}$ be recorded in the tokenisation service provider database.

20. The processor of claim 19, wherein the method further comprises the processor receiving from the tokenisation service provider processor a new tokenised card number tPAN associated with the virtual card number $vPAN^{xE1\cdots m}$ or identifier $N^{xE1\cdots m}$ and/or an indication that the virtual card number $vPAN^{xE1\cdots m}$ or identifier $N^{xE1\cdots m}$ is now associated with a new $tPAN^{1\cdots m}$ which is not associated with a real card number.

* * * * *